US012193089B2

(12) United States Patent
Chuo et al.

(10) Patent No.: US 12,193,089 B2
(45) Date of Patent: Jan. 7, 2025

(54) LINK MARGIN IMPROVEMENTS USING A VARIABLE PHYSICAL LAYER SYMBOL RATE

(71) Applicant: Google LLC, Mountain View, CA (US)

(72) Inventors: Li-Xuan Chuo, San Jose, CA (US); Qi Jiang, San Jose, CA (US); Daniel Barros, Sra da Hora (PT); Sunil Kumar, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/500,542

(22) Filed: Nov. 2, 2023

(65) Prior Publication Data
US 2024/0155711 A1 May 9, 2024

Related U.S. Application Data

(63) Continuation of application No. PCT/US2023/078340, filed on Nov. 1, 2023.

(60) Provisional application No. 63/440,047, filed on Jan. 19, 2023, provisional application No. 63/423,866, filed on Nov. 9, 2022.

(51) Int. Cl.
*H04W 76/14* (2018.01)
*H04W 28/10* (2009.01)

(52) U.S. Cl.
CPC ........... *H04W 76/14* (2018.02); *H04W 28/10* (2013.01)

(58) Field of Classification Search
CPC ..... H04W 76/10; H04W 76/14; H04W 28/10; H04W 76/15; H04W 72/04
See application file for complete search history.

(56) References Cited

U.S. PATENT DOCUMENTS

2020/0336520 A1 10/2020 Redding et al.
2023/0054769 A1* 2/2023 Solum .................. H04R 25/552

FOREIGN PATENT DOCUMENTS

WO  2020124610 A1  6/2020
WO  WO2020124610  *  6/2020  ............. H04W 4/00

OTHER PUBLICATIONS

International Search Report and Written Opinion for PCT/US2023/078340, Feb. 7, 2024, 82 Pages.
Bluetooth: "Bluetooth Core Specification Version 5.2 Feature Overview", Dec. 9, 2020 (Dec/ 9, 2020), pp. 1-37, XP055921837, Retrieved from the Internet: URL: https://www.bluetooth.com/wp-content/uploads/2020/01/Bluetooth_5.2_Feature_Overview.pdf [retrieved on May 17, 2022] 2.2.2.1 Link Layer 3.1.1 Physical Layer Variants.

* cited by examiner

*Primary Examiner* — Tuan H Nguyen
(74) *Attorney, Agent, or Firm* — Kilpatrick Townsend & Stockton LLP

(57) ABSTRACT

Various arrangements are presented for increasing a link margin of a wireless audio link. A short-range wireless communication link having a first physical layer (PHY) symbol rate is established between an audio source device and an audio output device. An audio stream is transmitted using the communication link, which includes a connected isochronous stream (CIS) link. A number of packet retransmissions are detected on the CIS. Based on the detected number of packet retransmissions on the CIS, the first PHY symbol rate of the CIS can be altered to a second PHY symbol rate for transmitting the audio stream.

19 Claims, 11 Drawing Sheets

LINK MARGIN IMPROVEMENTS USING A VARIABLE PHYSICAL LAYER SYMBOL RATE

CROSS-REFERENCE TO RELATED APPLICATION

This application is continuation of PCT Application No. PCT/US23/78340, filed on Nov. 1, 2023, and titled "LINK MARGIN IMPROVEMENTS USING A VARIABLE PHYSICAL LAYER SYMBOL RATE," which claims the benefit of and priority to U.S. Provisional Application No. 63/423,866, filed on Nov. 9, 2022, and titled "LINK ROBUSTNESS IMPROVEMENT FOR BLUETOOTH LE," and to U.S. Provisional Application No. 63/440,047, filed on Jan. 19, 2023, and titled "BLUETOOTH COMMUNICATION IMPROVEMENTS," the contents of which are herein incorporated by reference in their entirety for all purposes.

BACKGROUND

A strong link margin is preferrable for wireless communications. For example, when a user is using earbuds that communicate with another device, a larger link margin makes the wireless communication more tolerant to attenuation. By being more tolerant to attenuation, the user can have a better experience. An increased link margin can allow the earbuds (and thus the user) to be at a greater distance from the other device. Further, situations that cause meaningful attenuation, such as cross-body attenuation, are less likely to affect the user experience.

SUMMARY

Various embodiments are described related to a method for using a short-range wireless communication link between an audio source device and an audio output device, the short-range wireless communication link having a physical layer (PHY). In some embodiments, a method for using a short-range wireless communication link between an audio source device and an audio output device, the short-range wireless communication link having a physical layer (PHY) is described. The method may comprise transmitting, by the audio source device, an audio stream using a connected isochronous stream (CIS) of the short-range wireless communication link and a first PHY symbol rate of the PHY layer. The method may comprise detecting a number of packet retransmissions on the CIS. The method may comprise based on the detected number of packet retransmissions on the CIS, altering the first PHY symbol rate for the CIS to a second PHY symbol rate. The method may comprise transmitting, by the audio source device, the audio stream using the CIS on the short-range wireless communication link using the second PHY symbol rate.

Embodiments of such a method may include one or more of the following features: the second PHY symbol rate may be less than the first PHY symbol rate. The first PHY symbol rate may be two million symbols per second and the second PHY symbol rate may be either one million symbols per second or may be a coded PHY symbol rate. A link margin between the audio output device and the audio source device may be increased based on altering the first PHY symbol rate of the CIS to the second PHY symbol rate. The method may further comprise performing a pairing process between the audio source device and the audio output device to determine that PHY symbol rates are eligible to be altered without restarting the short-range wireless communication link. A PHY symbol rate for an asynchronous connection-oriented logical transport (ACL) link may be maintained as unchanged when altering the first PHY symbol rate of the CIS to a second PHY symbol rate. The short-range wireless communication link may be a Bluetooth Low Energy (LE) communication link. Altering the first PHY symbol rate of the CIS may be performed without restarting the short-range wireless communication link.

In some embodiments, an audio system is described. The system may comprise an audio source device that communicates wirelessly with an audio output device using a short-range wireless communication link. The audio source device may be configured to transmit an audio stream using a connected isochronous stream (CIS) of the short-range wireless communication link and a first PHY symbol rate of a physical (PHY) layer. The audio source device may be configured to detect a number of packet retransmissions on the CIS. The audio source device may be configured to alter the first PHY symbol rate for the CIS to a second PHY symbol rate based on the detected number of packet retransmissions on the CIS. The audio source device may be configured to transmit the audio stream using the CIS on the short-range wireless communication link using the second PHY symbol rate.

Embodiments of such a system may include one or more of the following features: the short-range wireless communication link may be a Bluetooth Low Energy (LE) communication link. The system may further include the audio output device. The audio output device may comprise true wireless earbuds. The audio output device may be a smartphone. The second PHY symbol rate may be less than the first PHY symbol rate. The first PHY symbol rate may be two million symbols per second and the second PHY symbol rate may be either one million symbols per second or may be a coded PHY symbol rate. The audio source device may be further configured to increase a link margin between the audio output device and the audio source device based on altering the first PHY symbol rate of the CIS to the second PHY symbol rate. The audio source device may be configured to alter the first PHY symbol rate of the CIS without restarting the short-range wireless communication link. The audio source device may be further configured to perform a pairing process with the audio output device to determine that PHY symbol rates may be eligible to be altered without restarting the short-range wireless communication link. The short-range communication link may use an asynchronous connection-oriented logical transport (ACL). An ACL PHY symbol rate may be maintained as unchanged when altering the first PHY symbol rate to the second PHY symbol rate.

In some embodiments, an audio source device is described. The device may comprise a wireless communication interface that communicates wirelessly with an audio output device using a short-range wireless communication link. The device may comprise a processing system comprising one or more processors in communication with the wireless communication interface. The processing system may be configured to transmit an audio stream using the short-range wireless communication link including a connected isochronous stream (CIS) that uses a first physical layer (PHY) symbol rate. The processing system may be configured to detect a number of packet retransmissions on the CIS. The processing system may be configured to, based on the detected number of packet retransmissions on the CIS, alter the first PHY symbol rate of the CIS to a second PHY symbol rate. The processing system may be configured to transmit, to the audio output device, the audio stream using the CIS and the second PHY symbol rate.

Embodiments of such a device may include one or more of the following features: the short-range wireless communication link may be a Bluetooth LE communication link and the audio source device may be configured to alter the first PHY symbol rate of the CIS without restarting the short-range wireless communication link. The second PHY symbol rate may be less than the first PHY symbol rate.

In some embodiments, a method for using a short-range wireless communication link is described. The method may comprise transmitting, by a source wireless communication device, data using and asynchronous connection-oriented logical transport (ACL) link of the short-range wireless communication link. The method may comprise determining an amount of time that has elapsed since a high throughput event on the ACL of the short-range wireless communication link. The method may comprise based on determining the amount of time, decreasing a first physical layer (PHY) symbol rate of the ACL to a second PHY symbol rate. The method may comprise transmitting, by the source wireless communication device, data using the ACL and the second PHY symbol rate.

Embodiments of such a method may include one or more of the following features: the high throughput event may be identified based on an amount of data to be transmitted. The high throughput event may be identified based on a detected change in use of the ACL. Determining the amount of time that has elapsed since the high throughput event may further comprise determining whether the amount of time has met an event threshold value. The first PHY symbol rate may be two million symbols per second and the second PHY symbol rate may be either one million symbols per second or may be a coded PHY symbol rate. A link margin between the source wireless communication device and a second wireless communication device may be increased based on altering the first PHY symbol rate of the ACL to the second PHY symbol rate. The method may further comprise performing a pairing process between the source wireless communication device and a second wireless communication device to determine that PHY symbol rates may be eligible to be altered without restarting the short-range wireless communication link. The source wireless communication device may be an audio streaming device and an audio output device that receives the data using the ACL may be a pair of true wireless earbuds. The short-range wireless communication link may be a Bluetooth LE communication link and altering the first PHY symbol rate of the ACL link may be performed without restarting the short-range wireless communication link.

In some embodiments, a wireless communication system is described. The system may comprise a source wireless communication device that may communicate wirelessly using a short-range wireless communication link. The source wireless communication device may be configured to transmit data using and asynchronous connection-oriented logical transport (ACL) of the short-range wireless communication link. The source wireless communication device may be configured to determine an amount of time that has elapsed since a high throughput event on the ACL of the short-range wireless communication link. The source wireless communication device may be configured to, based on determining the amount of time, decrease a first physical layer (PHY) symbol rate of the ACL to a second PHY symbol rate. The source wireless communication device may be configured to transmit data using the ACL and the second PHY symbol rate.

Embodiments of such a system may include one or more of the following features: true wireless earbuds. The source wireless communication device may be a smartphone. The high throughput event may be identified based on an amount of data to be transmitted. The high throughput event may be identified based on a detected change in use of the ACL. The source wireless communication device being configured to determine the amount of time that has elapsed since the high throughput event further may comprise the source wireless communication device being configured to determine whether the amount of time has met an event threshold value. The first PHY symbol rate may be two million symbols per second and the second PHY symbol rate may be either one million symbols per second or may be a coded PHY symbol rate. A link margin between the source wireless communication device and a second wireless communication device may increase based on altering the first PHY symbol rate of the ACL to the second PHY symbol rate. Altering the first PHY symbol rate of the ACL may be performed without restarting the short-range wireless communication link. The short-range wireless communication link may be a Bluetooth LE communication link. The source wireless communication device may be further configured to perform a pairing process with a second wireless communication device to determine that PHY symbol rates are eligible to be altered without restarting the short-range wireless communication link.

In some embodiments, a wireless communication device is described. The device may comprise a wireless communication interface that communicates wirelessly using a short-range wireless communication link. The device may comprise a processing system comprising one or more processors in communication with the wireless communication interface. The processing system may be configured to transmit data using and asynchronous connection-oriented logical transport (ACL) of the short-range wireless communication link. The processing system may be configured to determine an amount of time that has elapsed since a high throughput event on the ACL of the short-range wireless communication link. The processing system may be configured to, based on determining the amount of time, decrease a PHY symbol rate of the ACL to a second PHY symbol rate. The processing system may be configured to transmit data using the ACL and the second PHY symbol rate. The short-range wireless communication link may be a Bluetooth LE communication link.

BRIEF DESCRIPTION OF THE FIGURES

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
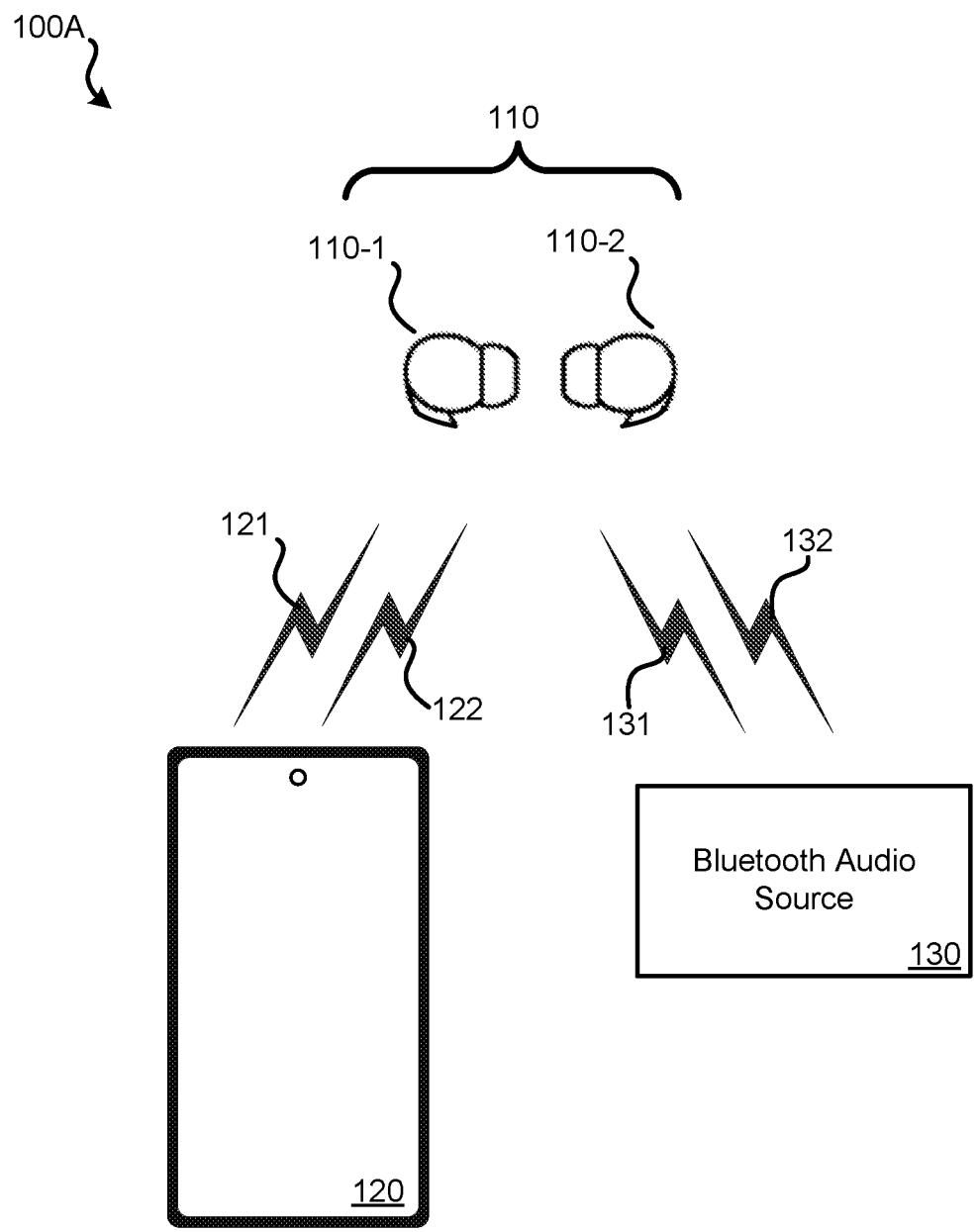
FIG. 1A illustrates an embodiment of an audio system.

Having as large of a link margin as possible between devices that are communicating wirelessly is desirable. "Link margin" is the difference between the received signal power and the signal power required for a certain quality of service. It is a measure of how much signal attenuation the link can tolerate before it becomes unusable. Link margin is typically expressed in decibels (dB). A positive link margin means that the communication link has more signal power than it needs, while a negative link margin means that the link does not have enough signal power to be received. The link margin can be calculated by taking the difference between the received signal power and the required signal power. The received signal power is determined by such factors as the transmitter power and the transmitter's antenna gain. The required signal power is determined by the receiver sensitivity and the modulation and coding scheme. As example, a 25 dB link margin means that 25 dB of attenuation between the transmitter and the receiver can be tolerated with the receiver still successfully receiving the transmitted signal. Therefore, as the link margin is increased, the amount of attenuation that can be tolerated similarly increases. As an example, by the link margin being greater, a user that is wearing wireless earbuds to receive audio or conduct a telephone call can move farther away from their smartphone from which the audio data is being transmitted.

As detailed herein, various arrangements are possible that allow for a link margin to be increased by adjusting the physical (PHY) layer symbol rate used. Bluetooth LE communications involve an asynchronous connection-oriented logical transport (ACL) link and, if audio is being transmitted, a connected isochronous stream (CIS) link. The link margin for an ACL link, CIS link, or both can be improved using the arrangements detailed herein.

In Bluetooth LE, a PHY layer symbol rate is established when a Bluetooth LE communication link is established between two devices, such as between an audio source, such as a smartphone, and an audio output device, such as wireless earbuds. As long as the Bluetooth LE communication link is active, the PHY layer symbol rate may remain unchanged. In the embodiments detailed herein, the PHY layer symbol rate can be changed without having to establish a new communication link. Rather, the PHY layer symbol rate can be changed at a time agreed to by both devices.

The symbol rates available for Bluetooth LE can be 2M (two million symbols per second), 1M (one million symbols per second), coded, S=2 (two symbols are used to encode a single bit), and coded S=8 (eight symbols are used to encode a single bit). All of these symbol rates can be transmitted at a same power level, and therefore, a consistent amount of power is used across each available symbol rate. While the power level may be unchanged, the link margin increases as the symbol rate decreases. For example, 1M may result in a 3 dB greater link margin than 2M.

Figure 1B:
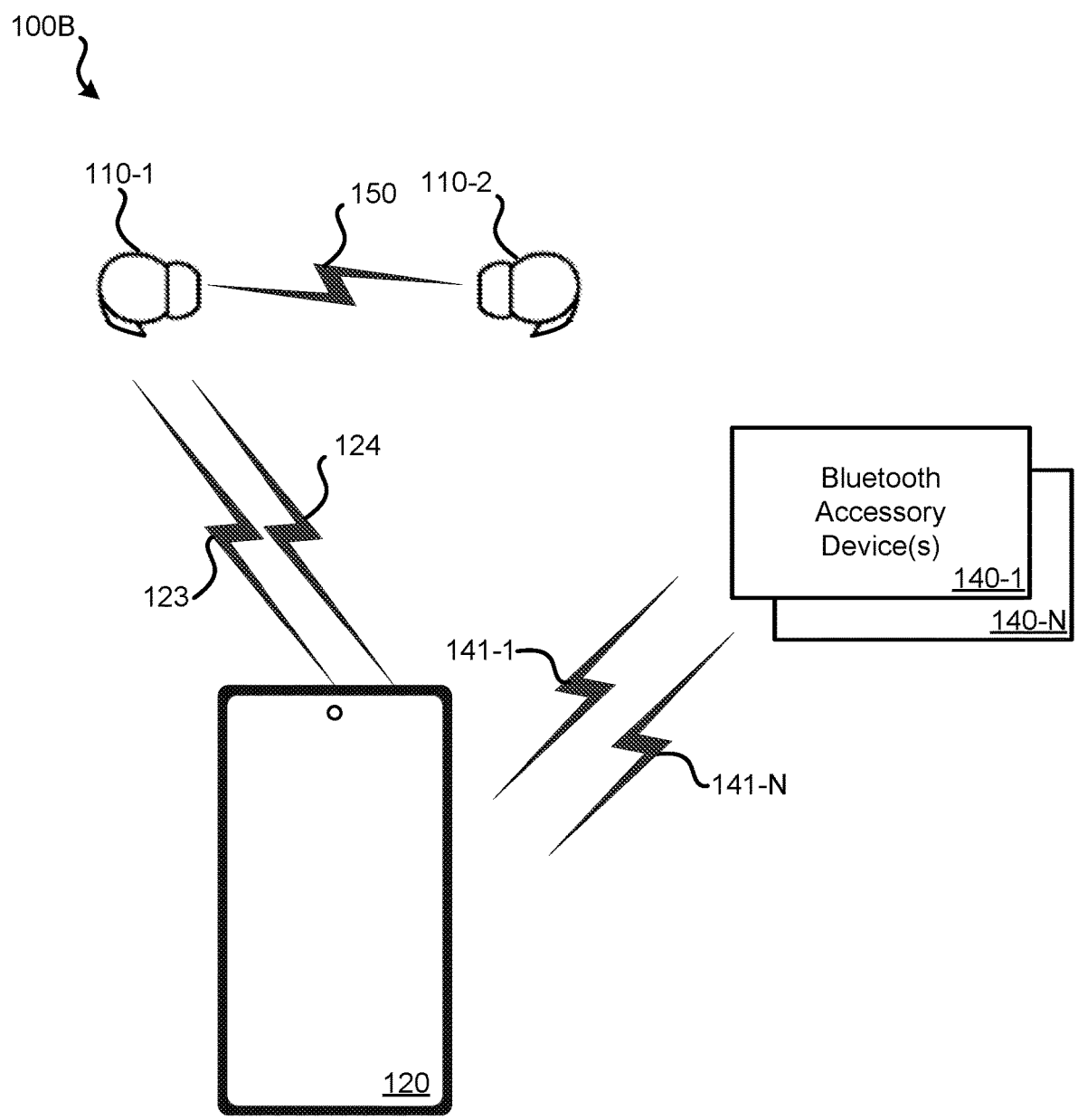
FIG. 1B illustrates another embodiment of an audio system.

In arrangements detailed herein, the CIS link, ACL link, or both can have their symbol rates adjusted without restarting a Bluetooth LE communication link. Data transmitted via a CIS link and an ACL link have different properties. While an ACL link is used for control data; a CIS link can be used for transmitting music and audio. Therefore, conditions may be monitored to determine the PHY symbol rate to use for each type of link of a Bluetooth LE communication link. Based on the number of packet retransmissions on a CIS link, the PHY symbol rate can be decreased if the decreased PHY symbol rate provides sufficient communication bandwidth for the current use. Based on the amount of time that has elapsed since a large throughput event, the PHY symbol rate for an ACL link can be stepped down or otherwise decreased over time. In response to a high throughput event, the PHY symbol rate can be increased to accommodate the high throughput event. Detail regarding these embodiments and others are provided in relation to the figures. FIGS. 1A and 1B illustrate embodiments of an audio system. As shown in FIG. 1A, audio system 100A can include earbuds 110 (which can include earbud 110-1 and earbud 110-2), audio source device 120, and audio source 130, and, as shown in FIG. 1B, audio system 100B can include earbuds 110, audio source device 120, and accessory devices 140 (which can include multiple accessory devices 140-1, . . . 140-N). (Although not shown, audio system 100A can also include accessory devices such as accessory devices 140.) Similarly, audio system 100B can also include additional audio sources such as audio source 130.

While embodiments detailed herein focus on earbuds 110 as the audio output device, it should be understood that alternative forms of wireless audio output devices can used in various embodiments of the systems and methods. For example, a wireless portable speaker may be used as the audio output device. As another option, wireless headphones or a wireless hearing aid may be used. When earbuds are used, the earbuds can be a pair of true wireless earbuds. "True wireless earbuds," as used herein, refer to earbuds that both: 1) receive audio packets wirelessly from one or more audio sources; and 2) are not physically connected with each other, such as via a wire. Therefore, in a pair of true wireless earbuds, each earbud must have its own power supply and wireless communication interface to allow for communication.

Audio source device 120 can represent various forms of computerized devices capable of short-range wireless communication, such as Bluetooth communications. As illustrated, one possible form of audio source device 120 is a smartphone. For example, a smartphone can output stereo audio (e.g., music, gaming audio, audio for an audio or video conference) and mono audio (e.g., audio for a telephone call, mono audio for an audio or video conference). Many other forms of audio source device 120 may be possible, such as: a tablet computer, a gaming device, a laptop computer, a desktop computer, a stereo system, and a television. More generally, any computerized device that outputs Bluetooth audio can serve as audio source device 120. In some embodiments, audio source device 120, when used for voice phone calls, can alternatively be used as and referred to as a call gateway. (In voice call terminology, earbuds 110 can be referred to as a "call terminal.")

In general, as detailed herein, Bluetooth-family protocols are used as the short-range wireless technology standards for exchanging data between audio source device 120 (and possibly audio source 130) and earbuds 110 and between audio source device 120 and accessory devices 140. Within the Bluetooth-family, various versions of Bluetooth may be used, depending on the particular embodiment. Bluetooth Basic Rate/Enhanced Data Rate (Bluetooth BR/EDR), which is also referred to as Bluetooth "Classic," can be used in various embodiments as detailed herein. Bluetooth Low Energy (LE) or LE Audio can be used as the specific Bluetooth-family protocol for communication. The same hardware may be used to implement any of these Bluetooth-family protocols.

Depending on the version of Bluetooth that is used, one or more Bluetooth profiles may be used to define a connection/communication protocol between a central (or first) device and peripheral (or second) device(s) and between peripheral devices. For example, the connection/communication protocol between the audio source device 120 and earbuds 110 may be defined by the Advanced Audio Distribution Profile (A2DP) and/or the Hands-Free Profile (HFP). Similarly, the connection/communication protocol between the audio source device 120 and the accessory devices 140 may be defined by the Human Interface Device (HID) Profile. The foregoing profiles are not intended to be limiting and the various embodiments described herein can use other Bluetooth profiles such as the Headset Profile (HSP) and the Mesh Profile (MESH).

Further, embodiments detailed herein may use one or more of these Bluetooth-family protocols as a starting point but may have additional features that go beyond the specification of the standard. These additional features require both an audio source and earbuds that are compatible with the additional features to be used in order for the additional features to be available. As an example, one manufacturer may produce earbuds and audio sources (e.g., smartphones, laptop computers, tablet computers) that support additional features that go beyond the minimum features of a Bluetooth-family protocol when used together. However, when one of such devices is used with another manufacturer's devices, such additional features beyond the Bluetooth-family may not be available unless the manufacturers have cooperated on implementing the additional features.

While the embodiments detailed herein are focused on improvements to Bluetooth-family protocols and specifically Bluetooth LE, it should be understood that the embodiments detailed herein can also be applied to various other short-range wireless communication technologies. For example, the embodiments detailed herein can be applicable to the following technologies: infrared data association (IrDA); radio frequency identification (RFID); wireless local access network (WLAN); near field communication (NFC); ZigBee; Z-wave; wireless fidelity (Wi-Fi) and wireless fidelity direct (Wi-Fi Direct); ultra-wideband (UWB); ANT and ANT+; various cellular technologies, such as fourth generation (4G), fifth generation (5G), and sixth generation (6G); and the like.

As illustrated in FIG. 1A, separate data streams may be used between an audio source and each earbud of earbuds 110. In a Bluetooth LE or LE Audio scenario, a connected isochronous stream (CIS) or broadcast isochronous stream (BIS) may be present on link 121 from audio source device 120 to earbud 110-1. A separate CIS or BIS may be present as part of link 122 to earbud 110-2. If audio is being transmitted from an earbud of earbuds 110 to audio source device 120 (e.g., from a microphone of an earbud for a phone call), another CIS or BIS may be present from an earbud to audio source device 120. Alternatively, the same CIS or BIS can be used for transmitting microphone audio from an earbud to audio source device 120. Separate CISs or BISs may also exist as part of wireless communications 131 and wireless communications 132 between an additional audio source such as audio source 130 and earbuds 110. Separately, between each audio source and each earbud, can be another channel, referred to as an asynchronous connection-oriented link (ACL) that allows for control data to be transmitted between the audio source and the particular earbud in both directions.

While one or more active communication channels are present between audio source device 120 and earbuds 110, one or more separate active communication channels can be present between earbuds 110 and audio source 130. Again here many other audio sources may be possible, such as: a tablet computer, a gaming device, a laptop computer, a desktop computer, a computerized music device, a stereo system, a television, or any computerized device that can output Bluetooth audio can serve as audio source 130.

Various use types exist where it can be beneficial to a user for earbuds 110 to have communication channels with multiple audio sources. For example, earbuds 110 may receive audio from a computer (e.g., as audio source device 120) for a video conference, but the user may desire to allow his smartphone (e.g., as audio source 130) to output notifications that are played instead of or over the audio for the video conference. As another example, a user may be listening to music via their smartphone (e.g., as audio source device 120), while listening to the music, the user may be in a public place that outputs auditory notifications via Bluetooth, such as flight notifications at an airport. A computerized system of the airport may function as audio source 130 which causes flight notifications to be output instead of or over the audio being streamed to earbuds 110 by audio source device 120.

Notably, audio source 130 may not be present in many embodiments or may only be intermittently present. Referring to the previous example, after leaving the airport (or perhaps disabling notifications), earbuds 110 may only receive audio from audio source device 120. Other similar examples exist. For example, referring to the first example, after conclusion of the video conference, earbuds 110 may only receive audio (e.g., the auditory notifications) from their smartphone. While the example of FIG. 1A illustrates two audio sources, it may be possible for earbuds 110 to receive audio from more than two audio sources. Earbuds 110 may be configured to prioritize and/or mix audio received concurrently from different audio sources.

For mono audio (e.g., a phone call, videoconference), the audio transmitted to one or each earbud of earbuds 110 from an audio source, such as audio source device 120, may be the same. For stereo audio (e.g., music playback, gaming), the audio transmitted to one or each earbud of earbuds 110 differs.

Referring to FIG. 1B, data may be transmitted between an audio source device 120 and a primary earbud such as earbud 110-1 of earbuds 110 and data may be transmitted between the primary earbud 110-1 and a secondary earbud such as earbud 110-2. In a Bluetooth Classic scenario, data may be transmitted using a synchronous connection-oriented (SCO) channel or extended synchronous connection-oriented (eSCO) channel that may be present on link 123 between audio source device 120 and primary earbud 110-1 and data may be transmitted using an ACL that may be present on link 150 between primary earbud 110-1 and secondary earbud 110-2. In some embodiments, the data on link 123 and/or link 150 can include audio or voice data. Control data can be transmitted in both directions using link 124, which can be an ACL link. Control data as used herein generally refers to information pertaining to the link between the audio source device 120 and primary earbud 110-1 and link between primary earbud 110-1 and the secondary earbud 110-2 (e.g., physical layer properties, timing information, encryption keys, power requirements, and the like). If audio is being transmitted from an earbud of earbuds 110 to audio source device 120 (e.g., from a microphone of an earbud for a phone call), the SCO or eSCO link may be used and/or another SCO or eSCO link (not shown) may be used. Separate links may also respectively exist as part of wireless communications 141-1 through wireless communications 141-N between audio source device 120 and accessory devices 140-1 through 140-N. In some embodiments, these links may be a link defined by the HID Profile under the Bluetooth core specification.

While one or more active communication channels are present between audio source device 120 and earbuds 110, one or more separate active communication channels can be present between audio source device 120 and accessory devices 140. Accessory device 140 can represent various forms of computerized devices capable of communicating and exchanging data using Bluetooth connections. One example of an accessory device included in accessory devices 140 is a wireless keyboard and another example of an accessory device included in accessory devices 140 is a wireless mouse. Other examples of accessory devices include human interface devices, printers, scanners, network devices, gaming devices, display assistants, and the like. In general, any computerized device that can communicate using Bluetooth can serve as an accessory device included in accessory devices 140. In some embodiments, an accessory device included in accessory devices 140 can be used as and referred to as a peripheral and/or human interface device.

In some embodiments, communication between earbuds 110 and audio source device 120 can be an acknowledgement, referred to as an ACK for short. An ACK can allow one of or both earbuds 110 to notify the audio source device 120 that a Bluetooth packet was properly received from the audio source device 120. Similarly, an ACK can allow the audio source device 120 to notify one of or both earbuds 110 that a Bluetooth packet was properly received from one of or both earbuds. An ACK and data packets between earbuds can be sent using the same radio used for Bluetooth communications. At a high level, when a packet addressed to a first earbud, such as earbud 110-1, and is properly received by earbud 110-1, earbud 110-1 can transmit an ACK to the audio source device 120. This arrangement can prevent the audio source device 120 from retransmitting the packet to the earbud 110-1 and/or can allow the earbud 110-1 to transmit the packet to earbud 110-2 if earbud 110-2 cannot intercept and/or otherwise acquire the packet transmitted from the audio source device 120. While an ACK is one form of communication that can occur between audio source device 120 and earbuds 110, other communications detailed herein between earbuds may not involve an ACK being transmitted.

Figure 2:
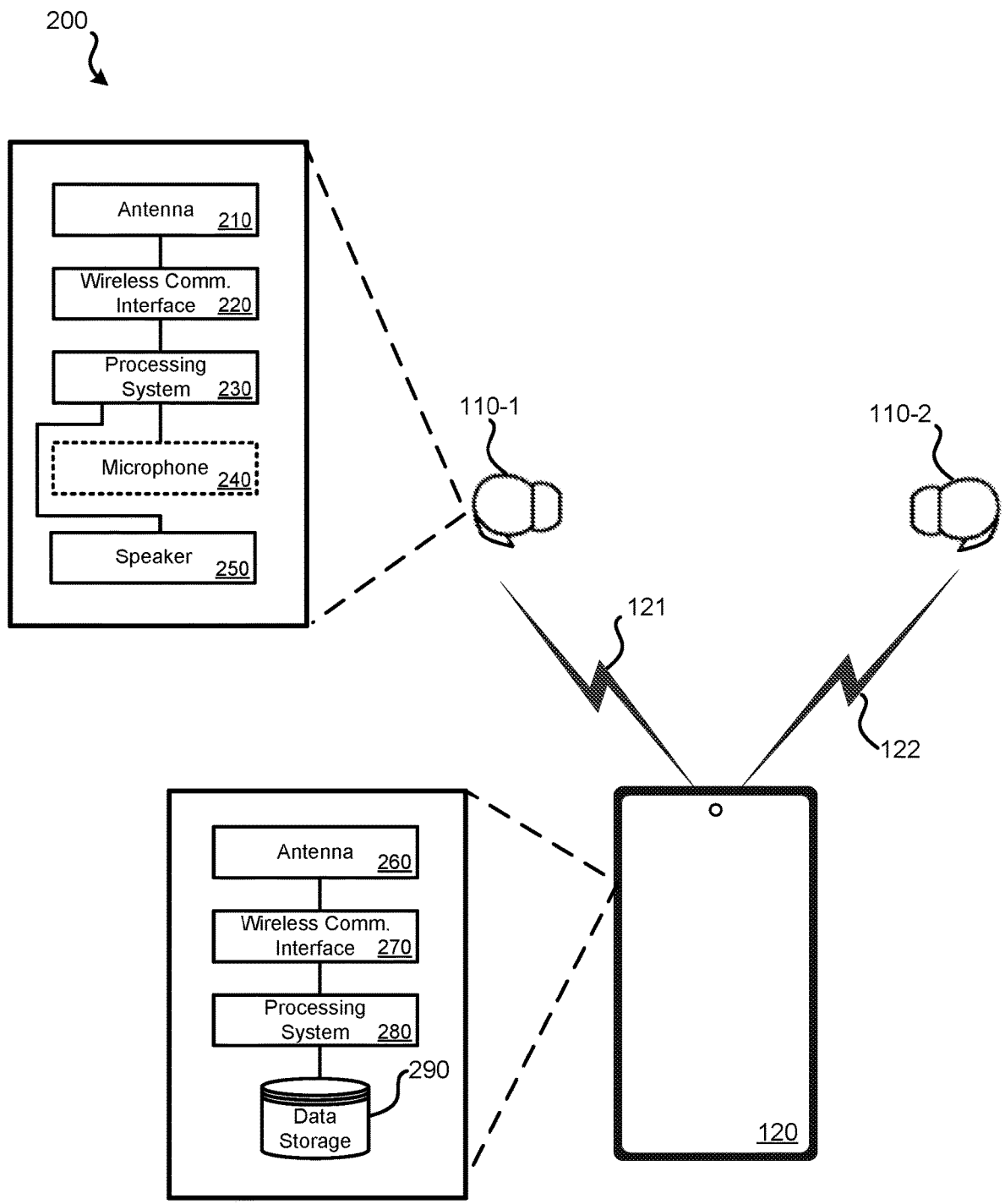
FIG. 2 illustrates an embodiment of a block diagram of an audio system that includes a pair of true wireless earbuds communicating with an audio source.

FIG. 2 illustrates an embodiment of a block diagram of an audio system 200 that includes a pair of true wireless earbuds communicating with an audio source. Audio system 200 can represent an embodiment of audio system 100A in which only a single audio source is present or audio system 100B. Audio system 200 can include earbuds 110 and audio source device 120.

Referring to earbuds 110, components of earbud 110-1 can include: antenna 210; wireless communication interface 220; processing system 230; microphone 240; and speaker 250. Earbud 110-2 may have the same components. Antenna 210 can be used for receiving and transmitting Bluetooth-family communications, including BR/EDR, and LE (including LE Audio which uses LE). Wireless communication interface 220 can be implemented as a system on a chip (SOC). Wireless communication interface 220 can include a Bluetooth radio and componentry necessary to convert raw incoming data (e.g., audio data, other data) to Bluetooth packets for transmission via antenna 210. Wireless communication interface 220 may also include componentry to enable one or more alternative or additional forms of wireless communication, both with an audio source and between earbuds. Processing system 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums, such as random-access memory (RAM), and/or flash memory. In some embodiments, processing system 230 and wireless communication interface 220 may be part of a same circuit or SOC.

In some earbuds, microphone 240 may be present. In some embodiments, each of earbuds 110 has a microphone. In other embodiments, only one of earbuds 110 has a microphone. In still other embodiments, no microphone may be present in either of earbuds 110. Audio captured using the one or more microphones of earbuds 110 can be transmitted to audio source device 120. This audio, which can be referred to as "upstream" audio, may include voice, such as for use in a telephone call, video conference, gaming, etc. Various componentry (not illustrated) may be present between wireless communication interface 220, processing system 230, and microphone 240, such as an analog to digital converter (ADC) and an amplifier.

Speaker 250 converts received analog signals to audio. Various componentry (not illustrated) may be present between wireless communication interface 220, processing system 230, and speaker 250, such as a digital to analog converter (DAC) and an amplifier.

Various components of earbud 110-1 are not illustrated. In addition to the ADC, DAC, and amplifiers previously mentioned, earbud 110-1 also includes a power storage component, such as one or more batteries, and associated componentry to allow for recharging of the power storage component. Also present is a housing and componentry to hold earbud 110-1 within a user's ear. One or more non-transitory processor readable mediums can be understood as present and accessible by wireless communication interface 220, processing system 230, or both. For instance, such mediums may be used for temporary storage of data (e.g., buffers) and storing data necessary for Bluetooth communication (e.g., encryption keys).

Audio source device 120 can include: antenna 260; wireless communication interface 270; processing system 280; and data storage 290. Antenna 260 can be used for receiving and transmitting Bluetooth-family communications, including BR/EDR, and LE. Wireless communication interface 270 can be implemented as a SOC. Wireless communication interface 270 can include a Bluetooth radio and componentry necessary to convert raw incoming data (e.g., audio data, other data) to Bluetooth packets for transmission via antenna 260. Wireless communication interface 270 can additionally or alternatively be used for one or more other forms of wireless communications. For example, wireless communication interface 270 can include hardware, such as including radios, antennas, and modems to communicate with other forms of wireless networks, such as wireless local area networks (e.g., WiFi networks) and/or cellular networks (e.g., 3G, 4G, 5G, and beyond). Processing system 280 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums via data storage 290, which can include RAM, flash memory, a HDD and/or a SSD. In some embodiments, processing system 280 and wireless communication interface 270 may be part of a same circuit or SOC. As detailed herein, data storage 290 can used to store various domain mappings which are used to correlate which communication protocol should be used and at which transmit power depending on the current regulatory domain.

Audio source device 120 can include various other components. For example, if audio source device 120 is a smartphone, various components such as: one or more cameras, a display screen or touch screen, volume control buttons, other wireless communication interfaces can be present.

Figure 3:
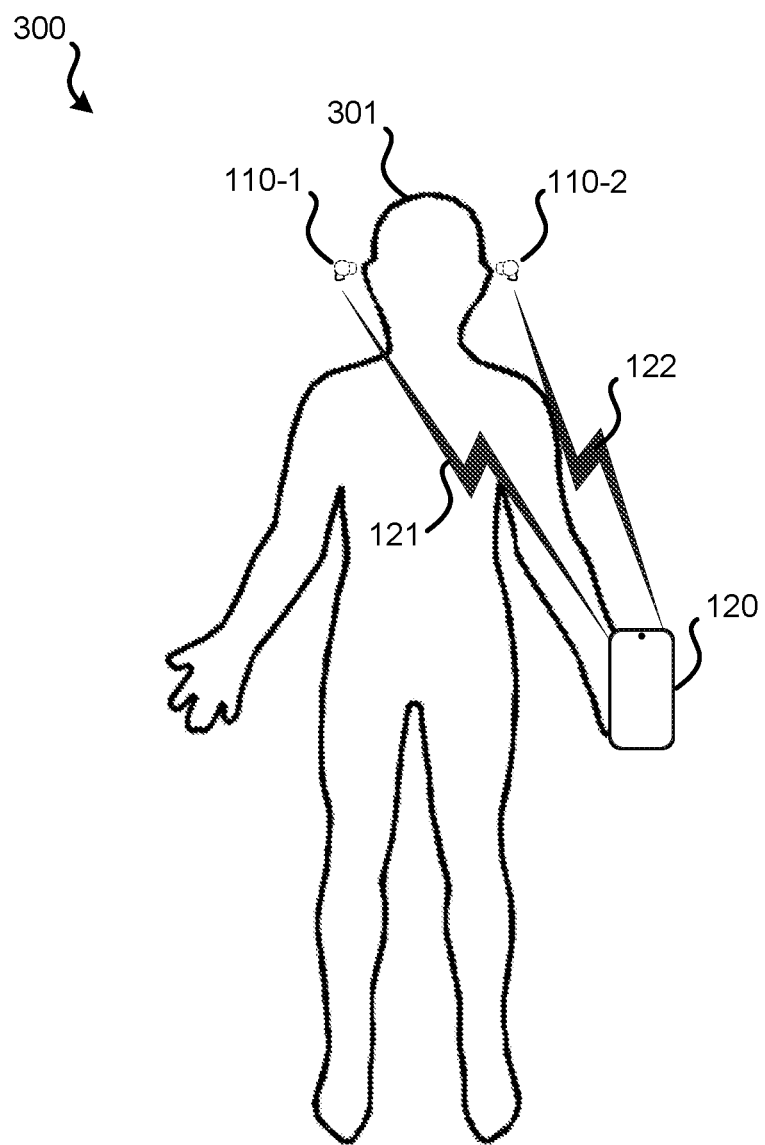
FIG. 3 illustrates an embodiment of cross-body attenuation resulting in communication between an audio source and a first earbud experiencing more attenuation than communication between the audio source and the second earbud.

As previously noted, having a greater link margin is preferrable in order to prevent attenuation from negatively affecting the ability of the audio output device, such as earbuds 110, from properly receiving audio from audio source device 120 (and, possibly, the reverse direction, such as for the transmission of acknowledgements and/or audio data based on audio captured using microphone 240). FIG. 3 illustrates an embodiment 300 of cross-body attenuation resulting in communication between an audio source and a first earbud experiencing more attenuation (or path loss) than communication between the audio source and the second earbud. In embodiment 300, user 301 is holding audio source device 120 in their left hand (that is, as illustrated, user 301 is facing out of the page). Bluetooth communications occur between audio source device 120 and earbud 110-2 as indicated by link 122; Bluetooth communications between audio source device 120 and earbud 110-1 as indicated by link 121.

Due to audio source device 120 being in the user's left hand, link 121 with earbud 110-1, which is in the user's right ear, results in wireless signals travelling through more of the user's body than link 122. Therefore, more attenuation occurs in link 121 than link 122. Accordingly, it is more likely that Bluetooth data packets exchanged between earbud 110-1 and audio source device 120 may not be properly received than Bluetooth data packets exchanged between earbud 110-2 and audio source device 120.

Which earbud experiences more attenuation and/or interference in its communications with an audio source can vary based on the location of audio source device 120. Common places where user 301 may keep audio source device 120 are: in a left hand; in a right hand; in a front left or right pocket, in a rear left or right pocket; on an arm band; in a left or right chest pocket; and on a surface or dock. Each of these locations can result in significantly different communication paths between each earbud and the antenna of the audio source and, thus, one earbud's communications can experience significantly higher interference or attenuation than the other earbud's communications.

Figure 4:
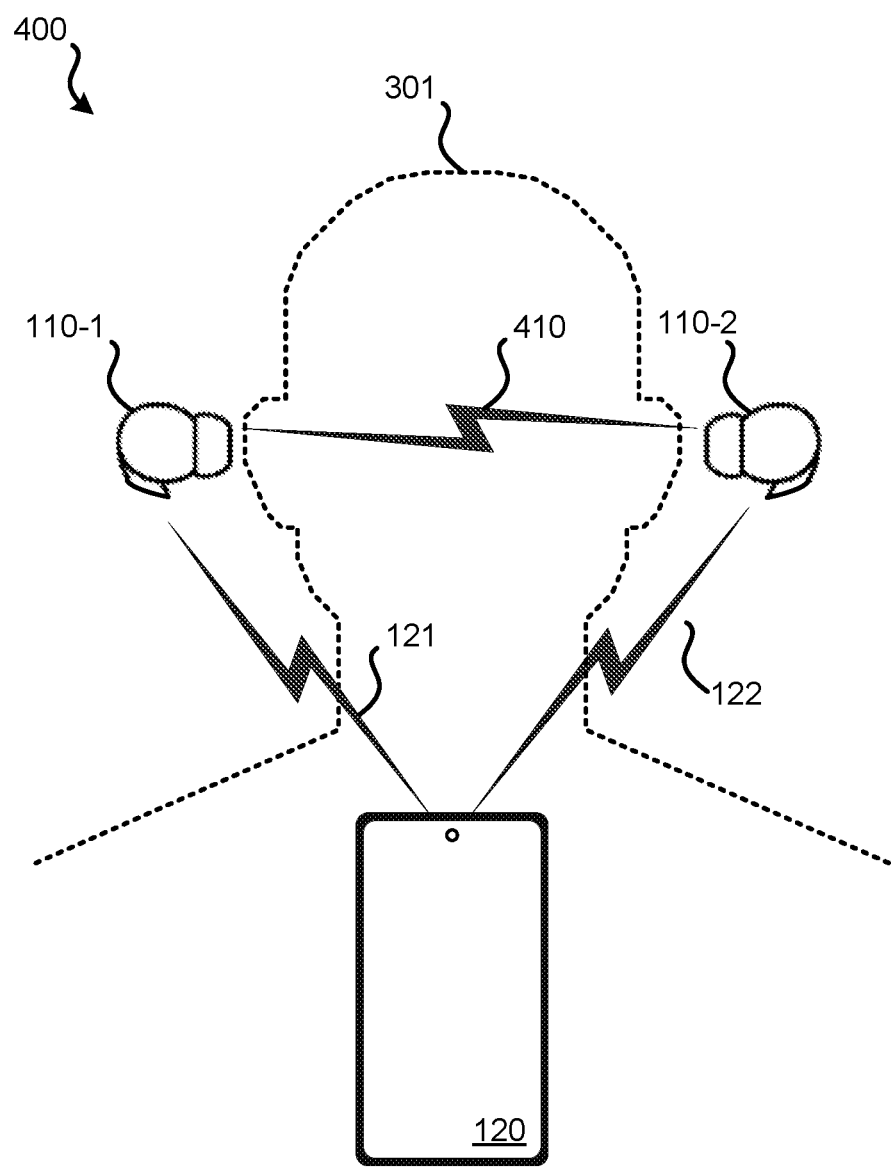
FIG. 4 illustrates an embodiment of an audio system in which true wireless earbuds communicate with each other in addition to communicating with an audio source.

FIG. 4 illustrates an embodiment of an audio system 400 in which true wireless earbuds communicate with each other in addition to communicating with an audio source. Earbud 110-1 can perform wireless communications using cross-link 410 with earbud 110-2 and, similarly, earbud 110-2 can perform wireless communications using cross-link 410 with earbud 110-1 in some embodiments. This communication can occur via a proprietary link specific to earbuds 110 and therefore can be outside of any Bluetooth family protocol specification. The path between earbuds 110, when in use by user 301, is predictable because the distance and the object through which the signals pass (the head of user 301) remains constant. As detailed herein, the ability of earbuds 110 to communicate with each other can have significant advantages.

Cross-link 410 can use LE 1M, LE 2M, LE HDT (pending standardization), LE proprietary high data rate modes, classic BR/EDR, or some proprietary communication scheme. Therefore, while Bluetooth-compliant wireless communications occur between earbuds 110 and audio source device 120, communications directly between earbuds do not necessarily need to be compliant with Bluetooth or any other particular communication protocol.

In some embodiments, communication between earbuds 110 can be a cross-acknowledgement, referred to as a CrossACK for short. As detailed herein, "cross-" communications refer to wireless communications transmitted directly from a first earbud and received by a second earbud. A CrossACK can allow one of earbuds 110 to notify the other earbud of earbuds 110 that a Bluetooth packet was properly received from a source device. A CrossACK and data packets between earbuds can be sent using the same radio used for Bluetooth communications. At a high level, when a packet addressed to only a first earbud is not properly received by the first earbud, but is properly received by the second earbud, the second earbud can transmit a CrossACK to the first earbud. The first earbud may then request the packet be relayed to the first earbud from the second earbud. This arrangement prevents the first earbud from having to request retransmission from the source device and/or can allow the first earbud to obtain the data from the second earbud if transmissions from the audio source continue to fail. While a CrossACK is one form of communication that can occur between earbuds 110, other communications detailed herein between earbuds may not involve a CrossACK being transmitted.

Notably, while the description contained herein focuses on Bluetooth and Bluetooth-family protocols including LE Audio, the same principles detailed herein can be applied to other short-range wireless communication protocols.

Figure 5:
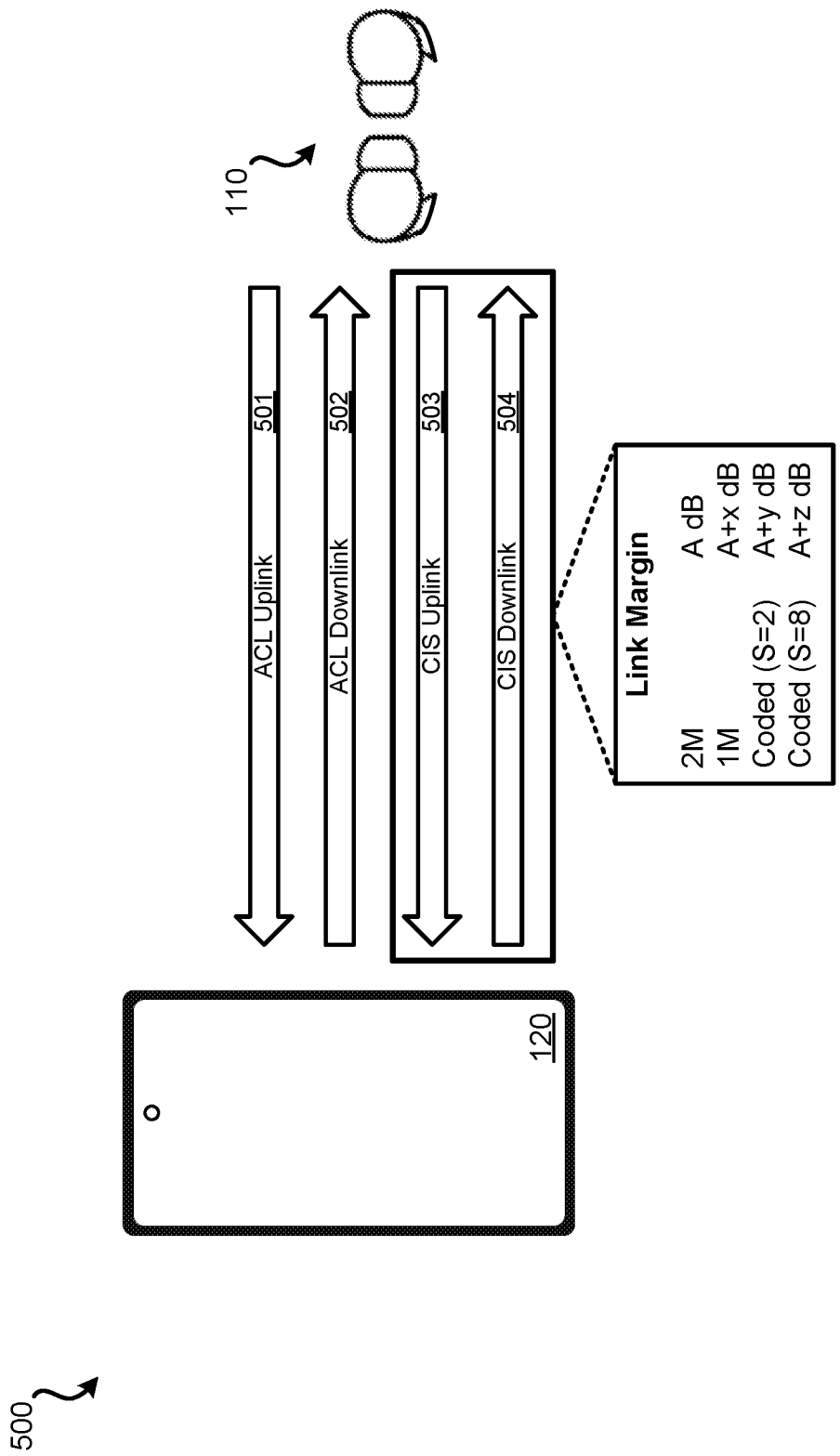
FIG. 5 illustrates an embodiment of how link margin for a CIS link of a Bluetooth LE communication link can be improved by lowering a physical layer symbol rate.

FIG. 5 illustrates an embodiment 500 of how link margin for a CIS link of a Bluetooth LE communication link can be improved by lowering a physical layer symbol rate. Embodiment 500 illustrates an audio source device 120 communicating with earbuds 110. In other embodiments, an audio output device other than earbuds may be used, such as a wireless speaker, headphones, etc. As part of a Bluetooth LE communication link an ACL link, which includes ACL uplink 501 from earbuds 110 to audio source device 120, is present. An ACL link is typically used for control data and tends to be less data intensive that other Bluetooth LE links, such as a CIS link. At minimum, on an ACL link, periodic acknowledgements are exchanged between devices. If these acknowledgements are not exchanged, other links between the devices as part of the Bluetooth LE communication link are severed, such as a CIS link.

When audio is being streamed from audio source device 120 to earbuds 110 and/or audio is being streamed from earbuds 110 to audio source device 120 (e.g., audio captured via a microphone of earbuds 110), a CIS link is used to transmit the audio as part of a Bluetooth LE communication link. The CIS link includes CIS uplink 503 and CIS downlink 504. If audio is only being streamed in one direction, such as from audio source device 120 to earbuds 110, the CIS link in the opposite direction, such as CIS uplink 503, is still needed, such as for transmitting acknowledgements (ACKs) and negative acknowledgements (NAKs).

For CIS uplink 503 and/or CIS downlink 504, an exemplary table of link margin is illustrated. When the PHY symbol rate of 2M is used, the link margin is A dB. The specific value of A is dependent on several factors, including properties of audio source device 120, earbuds 110, environmental conditions, transmit power, etc. When the PHY symbol rate of 1M is used, the link margin improves by some value, x. The value of x may be 3 dB. Similar increases in link margin can be realized by further decreasing the symbol rate. For example, y may represent an additional 3 dB gain in link margin over A+x. Similarly z may represent an additional 3 dB gain in link margin compared to A+y.

Notably, the link margin may differ for CIS uplink 503 compared to CIS downlink 504. Accordingly, the base link margin that is increased by decreasing the PHY symbol rate can vary based on whether in the uplink or downlink direction. Further, it some embodiments, the PHY symbol rate of the CIS link can be varied in one direction compared to the other. For example, if CIS uplink 503 has a smaller link margin than CIS downlink 504, it may be possible to decrease the PHY symbol rate of CIS uplink 503 to a lower symbol rate than CIS downlink 504.

Changes made to the PHY symbol rate of a CIS link may not affect the symbol rate used for the ACL link of the same Bluetooth LE communication link. Therefore, while the PHY symbol rate of the ACL link may be altered, such as in accordance with the embodiments of FIGS. 8-10, the alteration is optional.

Figure 6:
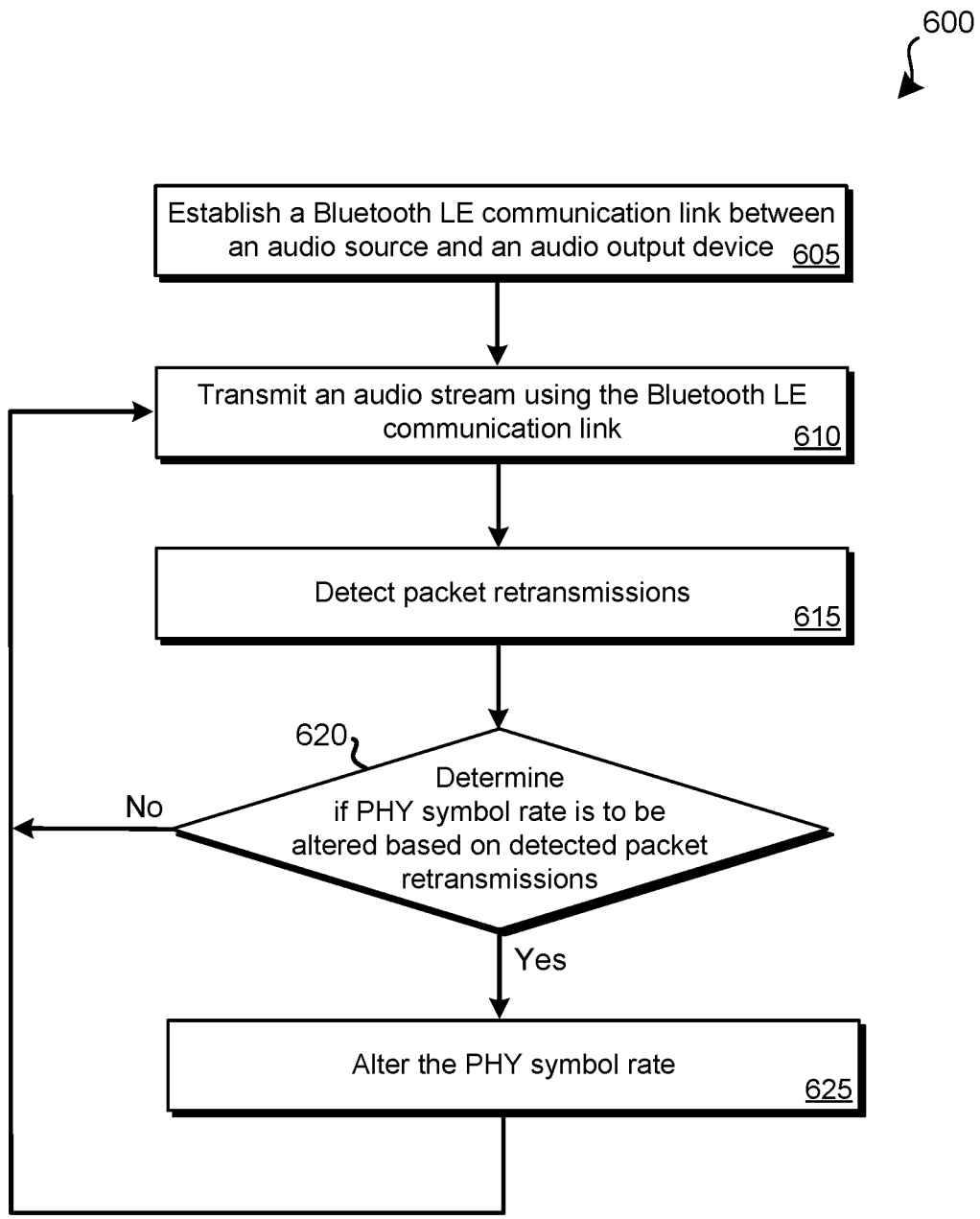
FIG. 6 illustrates an embodiment of a method for increasing a link margin of a wireless audio link.

FIG. 6 illustrates an embodiment of a method 600 for increasing a link margin of a wireless audio link. The blocks of method 600 can be performed by the audio source device, the audio output device, or a combination of both. Method 600 can be performed involving an audio source device and an audio output device, such as earbuds (e.g., true wireless earbuds), a wireless speaker, headphones, etc. In the case of true wireless earbuds in which there is a separate CIS link for each earbud, method 600 can be applied to both earbuds or to an individual earbud. Method 600 could also be performed between two devices that utilize a CIS link of a Bluetooth LE communication link for purposes other than transfer of an audio stream. The description of method 600 refers to Bluetooth LE, however, it should be understood that the same principles can be applied to other short-range wireless communication technologies.

At block 605, a Bluetooth LE communication link is established between an audio source and an audio output device. When the Bluetooth LE communication link is established, an ACL link may be created. For audio to be transmitted from the audio source device to the audio output device, a CIS link is additionally created as part of the Bluetooth LE communication link. By default, a particular PHY symbol rate, such as the maximum symbol rate of 2M, may be initially used for the PHY symbol rate of a CIS link (e.g., in both the uplink and downlink directions) of a Bluetooth LE communication link.

At block 610, an audio stream is transmitted using the Bluetooth LE communication to the audio output device by the audio source device. Similarly, the audio stream is received by the audio output device from the audio source device. The audio stream transmitted is transmitted as part of the Bluetooth LE Communication link on a CIS link. An upstream and downstream CIS link is created, even if audio is to be transmitted in only one direction. The opposite direction is used at least for ACKs and NAKs. Transmission of the audio stream can initially be performed using the initial symbol rate set at block 605, such as 2M.

At block 615, packet retransmissions are detected. The detection and monitoring of packet retransmissions can be performed by the audio source device or the audio output device. A packet retransmission occurs when in response to an audio packet being transmitted on the CIS link, the audio output device either responds with a NAK or fails to respond. In response to the NAK or failure to respond, the audio source retransmits the audio data of the previous packet. At block 615, the number of packet retransmissions is monitored. The number of packet retransmissions in a given window of time, such as one second, two seconds, five seconds, or some other window of time can be tracked by either the audio source device, the audio output device or both.

At block 620, a determination is made of whether the current PHY symbol rate is to be adjusted based on the packet retransmissions detected at block 615. Similar to block 615, block 620 can be performed by either the audio source device or the audio output device. The determination of block 620 can involve the monitored number of retransmissions for the window of time being compared to a stored retransmission threshold value. If the number of retransmissions meets or exceeds the threshold value, method 600 proceed to block 625. Otherwise, method 600 returns to block 610 with the CIS link continuing to use the same PHY symbol rate.

At block 625, the PHY symbol rate is altered. Altering the PHY symbol rate at block 625 can involve stepping down to a next lower symbol rate, such as from 2M to 1M, from 1M to coded (S=2), or from coded (S=2) to coded (S=8). Alternatively, a symbol rate may be skipped, such as an alteration from 2M to coded (S=2). Communications are exchanged between the audio source device and the audio output device to determine when the PHY symbol rate will be updated. A particular upcoming (e.g., the next) anchor point of the Bluetooth LE communication link may identified as the common point when communication on the CIS uplink, CIS downlink, or both will have the PHY symbol rate adjusted. Notably, for audio output devices and audio source devices that are compatible with this functionality, the Bluetooth LE communication link does not need to be restarted, thus allowing for audio playback to remain continuous. As an example, this ability to change PHY symbol rate without restarting the Bluetooth LE communication link may be included in devices manufactured by a common manufacturer. Therefore, an audio source device (e.g., smartphone) and audio output device (true wireless earbuds) may be compatible with the ability to agree with the other device on an anchor point at which to change PHY symbol rate.

The PHY symbol rate may also be increased if the current PHY symbol rate is less than the maximum rate (e.g., 2M). At block 620, if, for example, less than a minimum number of retransmissions has occurred over a defined period of time, the PHY symbol rate at block 620 may instead be increased. Alternatively, as long as the amount of bandwidth available on the CIS link is sufficient, the PHY symbol rate may not be increased. If a use case change is detected, such as the bitrate of the audio being output changes, the PHY symbol rate may be increased in response to the use case change. Following block 625, method 600 can return to block 610.

Figure 7:
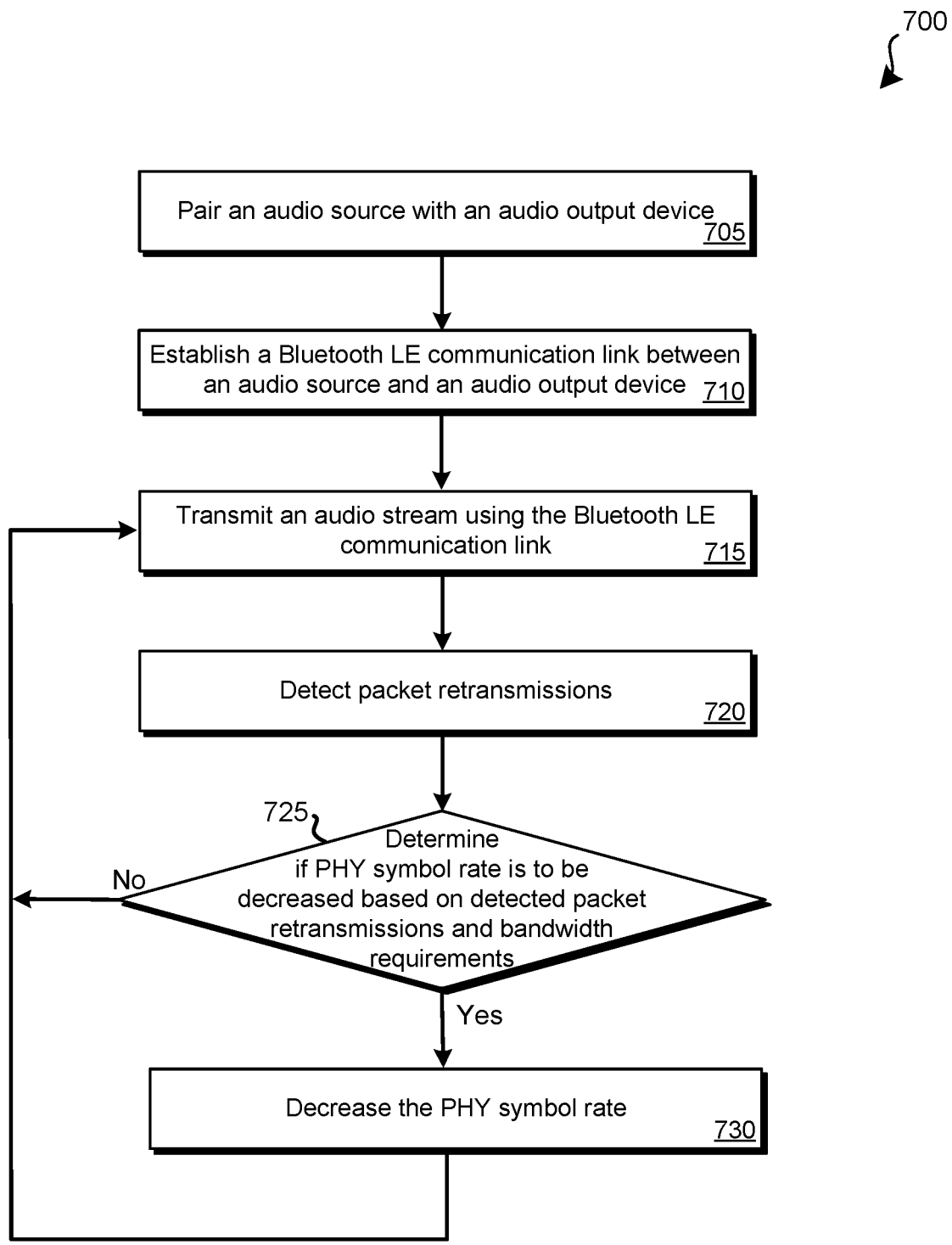
FIG. 7 illustrates another embodiment of a method for increasing a link margin of a wireless audio link.

FIG. 7 illustrates an embodiment of a method 700 for increasing a link margin of a wireless audio link. Method 700 can represent an embodiment of method 600 with additional blocks. The blocks of method 700 can be performed by the audio source device, the audio output device, or a combination of both. Method 700 can be performed involving an audio source device and an audio output device, such as earbuds (e.g., true wireless earbuds), a wireless speaker, headphones, etc. In the case of true wireless earbuds in which there is a separate CIS link for each earbud, method 700 can be applied to both earbuds or to an individual earbud. Method 700 could also be performed between two devices that utilize a CIS link of a Bluetooth LE communication link for purposes other than transfer of an audio stream. The description of method 700 refers to Bluetooth LE, however, it should be understood that the same principles can be applied to other short-range wireless communication technologies.

At block 705, an initial Bluetooth pairing process can be performed between the audio output device and the audio source. During the pairing process, the capabilities of the devices may be discovered. As part of block 705, a determination is made that the audio source device and the audio output device are mutually compatible with performing PHY symbol rate adjustments without ending and restarting a Bluetooth LE communication link. The determination may be made based on both the audio source device and the audio output device having been manufactured by the same manufacturer.

At block 710, a Bluetooth LE communication link is established between an audio source and an audio output device. When the Bluetooth LE communication link is established, an ACL link may be created. For audio to be transmitted from the audio source device to the audio output device, a CIS link is additionally created as part of the Bluetooth LE communication link. By default, a particular PHY symbol rate, such as the maximum symbol rate of 2M, may be initially used for the PHY symbol rate of a CIS link (e.g., in both the uplink and downlink directions) of a Bluetooth LE communication link.

At block 715, an audio stream is transmitted using the Bluetooth LE communication to the audio output device by the audio source device. Similarly, the audio stream is received by the audio output device from the audio source device. The audio stream transmitted is transmitted as part of the Bluetooth LE Communication link on a CIS link. An upstream and downstream CIS link is created, even if audio is to be transmitted in only one direction. The opposite direction is used at least for ACKs and NAKs. Transmission of the audio stream can initially be performed using the initial symbol rate set at block 710, such as 2M.

At block 720, packet retransmissions are detected. as detailed in relation to block 615. At block 725, a determination is made of whether the current PHY symbol rate is to be decreased based on the packet retransmissions detected at block 720. Similar to block 720, block 725 can be performed by either the audio source device or the audio output device. The determination of block 725 can involve the monitored number of retransmissions for the window of time being compared to a stored retransmission threshold value. Block 725 can additionally include an assessment of bandwidth requirements. The bit rate of the audio being transmitted can be assessed as part of block 725 to determine if a reduced PHY symbol is capable of providing sufficient bandwidth to transmit the audio stream. If the reduced PHY symbol rate does not provide sufficient bandwidth, method 700 can proceed to block 715 regardless of the number of packet retransmission. If the number of retransmissions meets or exceeds the threshold value and sufficient bandwidth is available at a lower PHY symbol rate, method 700 proceed to block 730. Otherwise, method 700 returns to block 715 with the CIS link continuing to use the same PHY symbol rate.

At block 730, the PHY symbol rate is decreased. Decreasing the PHY symbol rate at block 730 can involve stepping down to a next lower symbol rate, such as from 2M to 1M, from 1M to coded (S=2), or from coded (S=2) to coded (S=8). Communications are exchanged between the audio source device and the audio output device to determine when the PHY symbol rate will be updated. A particular upcoming (e.g., the next) anchor point of the Bluetooth LE communication link may identified as the common point when communication on the CIS uplink, CIS downlink, or both will have the PHY symbol rate adjusted. Notably, for audio output devices and audio source devices that are compatible with this functionality as discovered at block 705, the Bluetooth LE communication link does not need to be restarted, thus allowing for audio playback to remain continuous.

The PHY symbol rate may be increased if the current PHY symbol rate is less than the maximum rate (e.g., 2M). If a use case change is detected, such as the bitrate of the audio being output increases, the PHY symbol rate may be increased in response to the use case change. Following block 730, method 700 can return to block 715.

Figure 8:
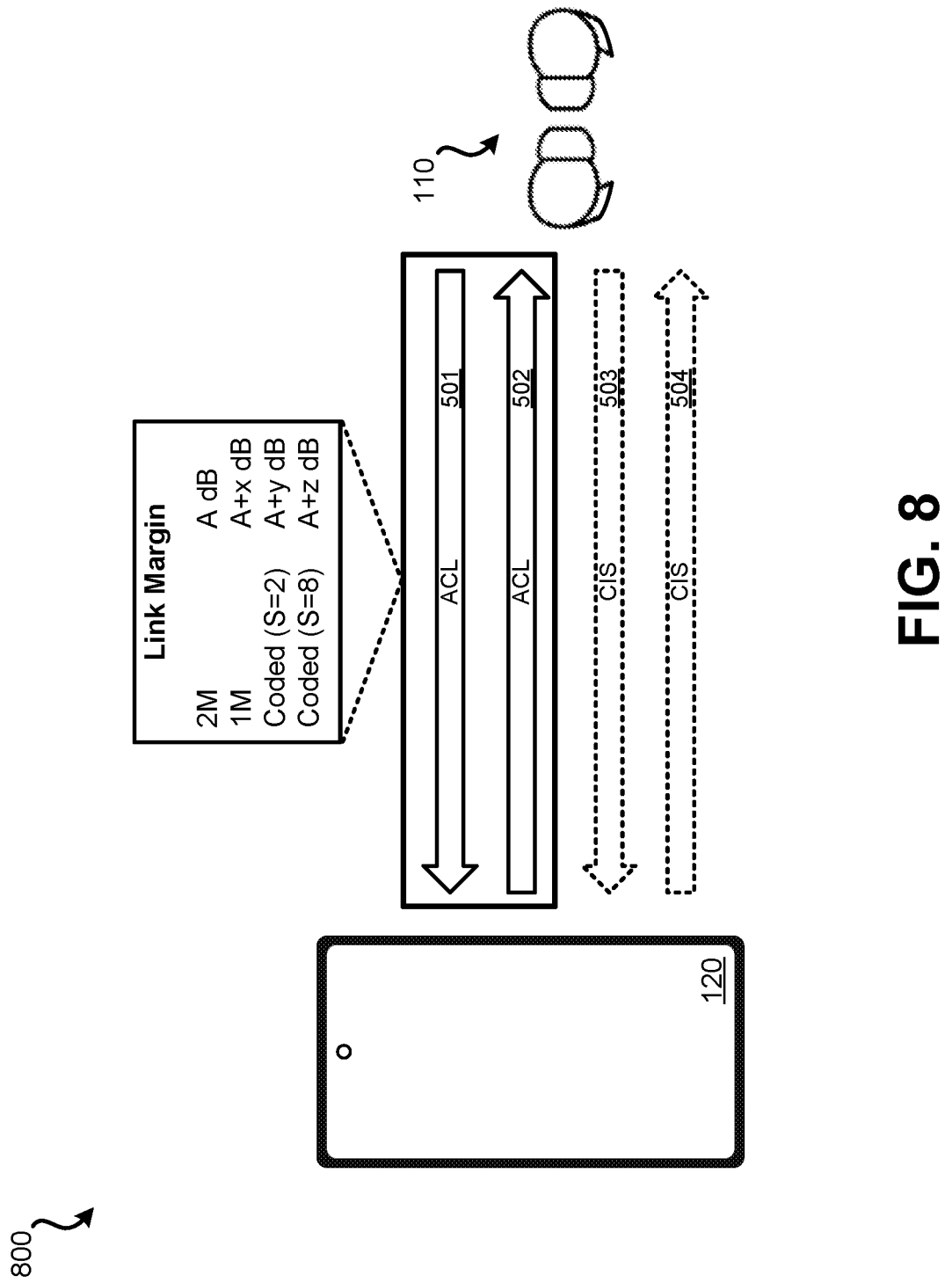
FIG. 8 illustrates an embodiment of how link margin for an ACL link of a Bluetooth LE communication link can be improved by lowering a physical layer symbol rate.
Figure 9:
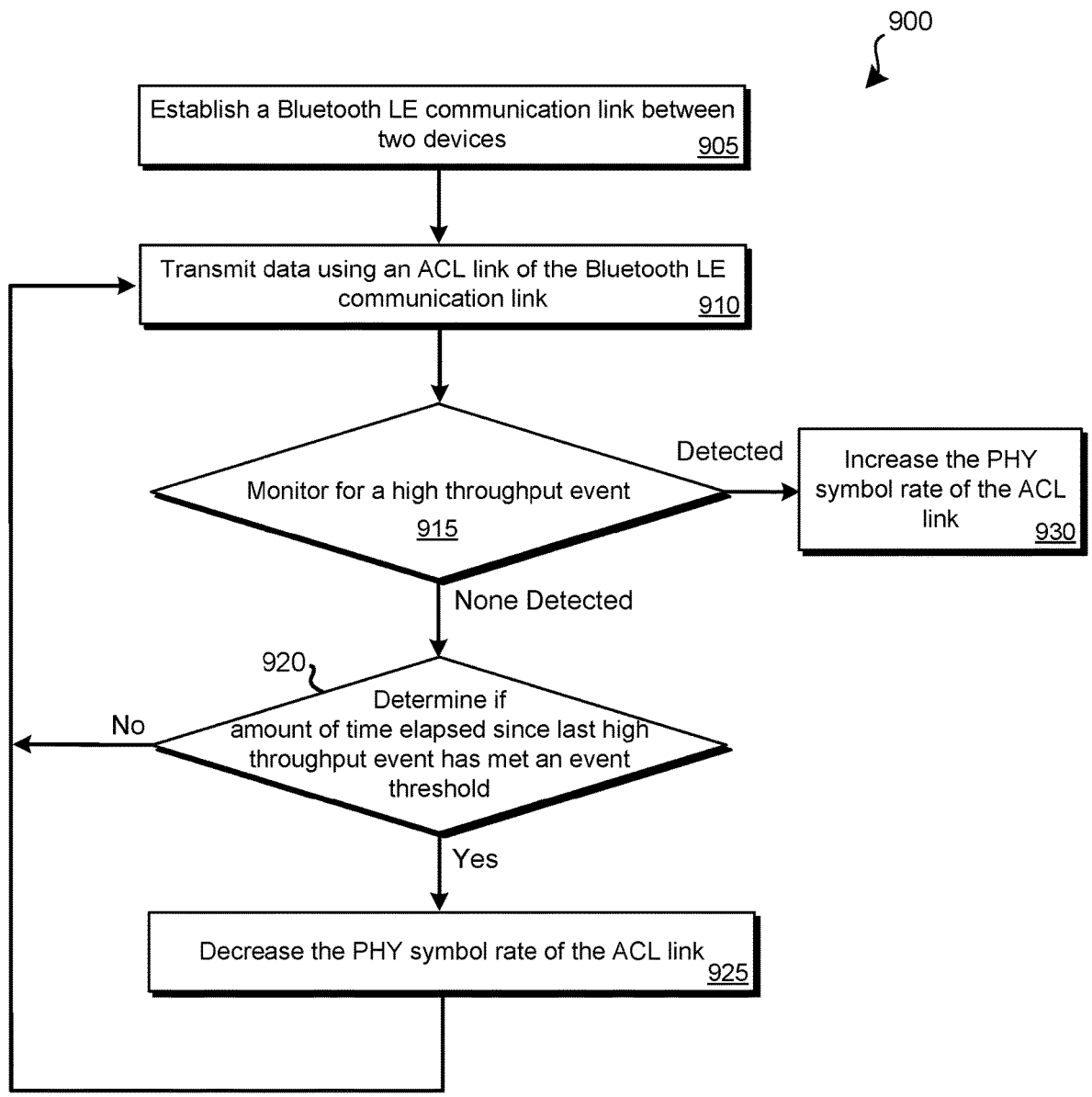
FIG. 9 illustrates an embodiment of a method for increasing a link margin of a wireless communication link.
Figure 10:
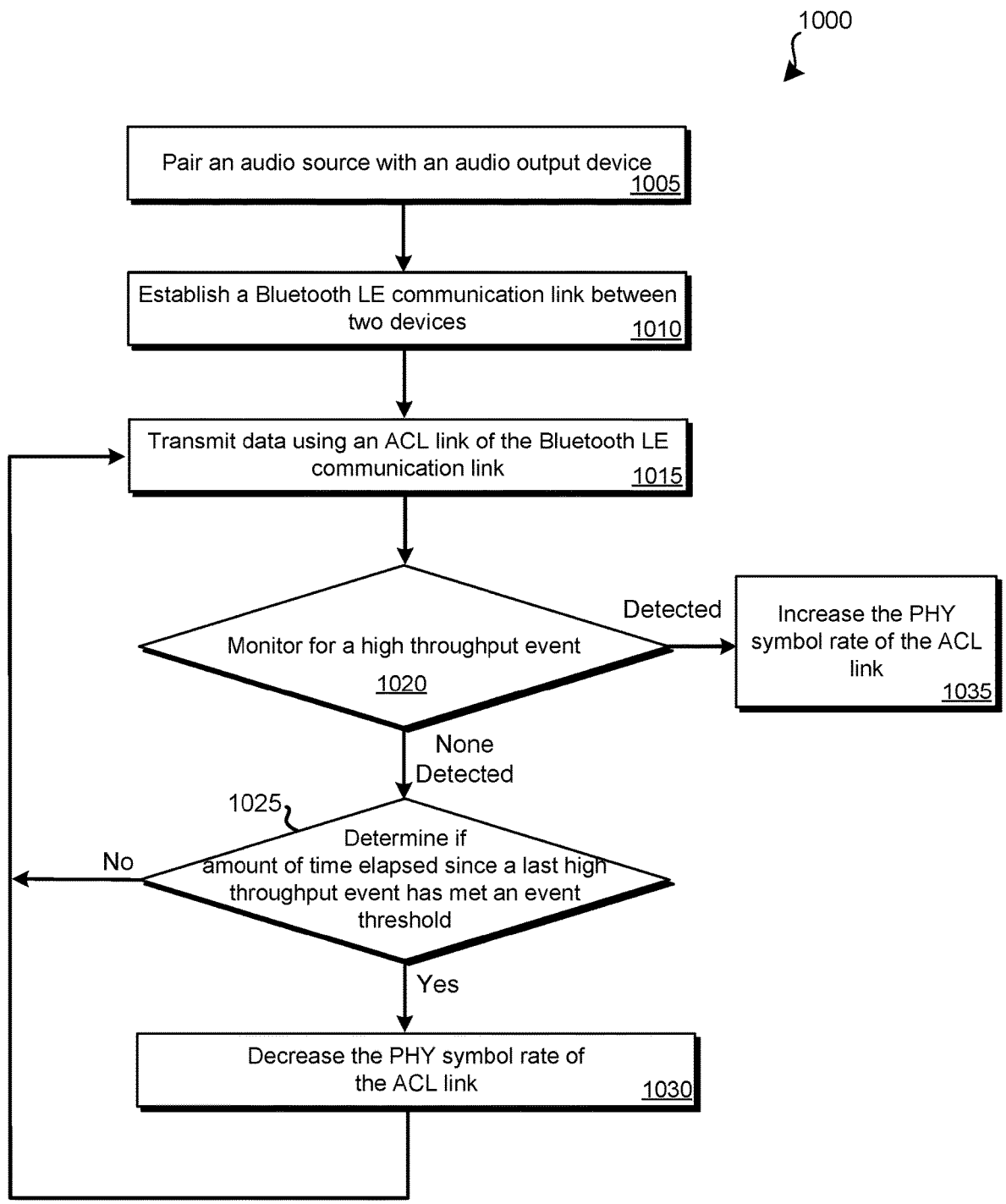
FIG. 10 illustrates another embodiment of a method for increasing a link margin of a wireless communication link.

While FIGS. 5-7 are focused on how the link margin for a CIS link of a Bluetooth LE communication link can be improved by lowering a physical layer symbol rate, FIGS. 8-10 are focused on how an ACL link of a Bluetooth LE communication link can be improved by lowering a physical layer symbol rate. The embodiments of FIGS. 5-10 can be used together. However, these embodiments can also be used independently. For example, an ACL link can exist without a corresponding CIS link. While a CIS link can require the existence of an ACL link, it is possible to adjust the PHY rate of the CIS link without adjusting the PHY rate of the ACL link. The reverse is also true—the PHY rate of the ACL link can be adjusted without adjusting the PHY rate of a CIS link, if present.

FIG. 8 illustrates an embodiment 800 of how link margin for an ACL link of a Bluetooth LE communication link can be improved by lowering a physical layer symbol rate. Embodiment 800 illustrates an audio source device 120 communicating with earbuds 110. In other embodiments, an audio output device other than earbuds may be used, such as a wireless speaker, headphones, etc. As part of a Bluetooth LE communication link an ACL link, which includes ACL uplink 501 from earbuds 110 to audio source device 120, is present. An ACL link is typically used for control data and tends to be less data intensive that other Bluetooth LE links, such as a CIS link. At minimum, on an ACL link, periodic acknowledgements are exchanged between devices. If these acknowledgements are not exchanged, other links between the devices as part of the Bluetooth LE communication link are severed, such as a CIS link. The ACL link includes ACL uplink 501 and ACL downlink 502.

A CIS link, which is illustrated as CIS uplink 503 and CIS downlink 504, may or may not be present. The CIS link may only be present if audio is being streamed from audio source device 120 to earbuds 110 or from earbuds 110 to audio source device 120.

For ACL uplink 501 and/or ACL downlink 502, an exemplary table of link margin is illustrated. When the PHY symbol rate of 2M is used, the link margin is A dB. The specific value of A is dependent on several factors, including properties of audio source device 120, earbuds 110, environmental conditions, transmit power, etc. When the PHY symbol rate of 1M is used, the link margin improves by some value, x. The value of x may be 3 dB. Similar increases in link margin can be realized by further decreasing the symbol rate. For example, y may represent an additional 3 dB gain in link margin over A+x. Similarly z may represent an additional 3 dB gain in link margin compared to A+y.

While the same variable names are used as in FIG. 5, the values for the CIS link and ACL link can vary from each other. Further, the link margin may differ for ACL uplink 501 compared to ACL downlink 502. Accordingly, the base link margin that is increased by decreasing the PHY symbol rate can vary based on whether in the uplink or downlink direction. Further, it some embodiments, the PHY symbol rate of the ACL link can be varied in one direction compared to the other. For example, if ACL uplink 501 has a smaller link margin than ACL downlink 502, it may be possible to decrease the PHY symbol rate of ACL uplink 501 to a lower symbol rate than ACL downlink 502.

Changes made to the PHY symbol rate of the ACL link may not affect the symbol rate used for other links, such as a CIS link, of the same Bluetooth LE communication link. Therefore, while the PHY symbol rate of the CIS link may also be altered, such as in accordance with the embodiments of FIGS. 5-7, the alteration is optional.

FIG. 9 illustrates an embodiment of a method 900 for increasing a link margin of a wireless communication link. Method 900 can be applied to an ACL uplink, an ACL downlink, or collectively to the ACL link. The blocks of method 900 can be performed by a first device that is part of the Bluetooth LE communication link, a second device that is part of the Bluetooth LE communication link, or a combination of both. Method 900 can be performed involving an audio source device (e.g., smartphone, laptop, tablet computer, etc.) and an audio output device, such as earbuds (e.g., true wireless earbuds), a wireless speaker, headphones, etc. The two devices that utilize the Bluetooth LE communication link can do so for purposes other than audio transfer. For example, an ACL link may be used for communication between a computerized device (e.g., laptop, desktop, tablet computer) and a wireless input device (e.g., keyboard, mouse) or a smart watch. In some embodiments, a voice command spoken by a user to a device, such as spoken to an audio output device, can be transmitted to the audio source device via an ACL link. The description of method 900 refers to Bluetooth LE, however, it should be understood that the same principles can be applied to other short-range wireless communication technologies.

At block 905, a Bluetooth LE communication link is established between the first device and the second device. When the Bluetooth LE communication link is established, an ACL link may be created. By default, a particular PHY symbol rate, such as the maximum symbol rate of 2M, may be initially used for the PHY symbol rate of the ACL link (e.g., in both the uplink and downlink directions) of a Bluetooth LE communication link.

At block 910, data is transmitted using the Bluetooth LE communication between the first and second devices via the ACL link. ACKs and NAKs can also be transmitted in response to received (and improperly received) packets on the ACL link. Transmission of the data can initially be performed using the initial symbol rate set at block 905, such as 2M.

At block 915, a high throughput event can be monitored for by the first and/or second device. Monitoring for a high throughput event can be performed in several ways. The number of packets or data volume received for transmission over a specific period of time can be tracked. When this number of volume exceeds a defined threshold, which can be specific to the current PHY symbol rate being used, a high throughout event is present. For example, a high throughput event can be said to be present at different thresholds for when Coded (S=8) is the current PHY rate compared to 1M.

In other embodiments, a high throughput event can be detected based on a use change of the ACL link. For example, in response to a device receiving input indicating that the user is providing a vocal command to be relayed to the other device, this use change can be identified as a high throughput event. As another example, if a different application is launched on one of the devices, changing active applications can be identified as a high throughput event. In some embodiments, changing applications may only be recognized as a high throughput event if the type of application is a member of a particular category.

Block 915, while illustrated as occurring between blocks 910 and 920, may occur whenever a high throughput event is detected. Following block 915, in a high throughput event is detected, at block 930, the PHY symbol rate of the ACL link can be increased. In some embodiments, the PHY symbol rate is always increased to the maximum PHY symbol rate, such as 2M. In other embodiments, the PHY symbol rate may only be increased sufficiently to accommodate the high throughput event or increased by one "step" to the next-highest PHY symbol rate.

If a high throughput event has not been detected at block 915, method 900 proceeds to block 920. At block 920, either the first or second device can determine whether an amount of time that has elapsed since a previous high throughout event has met a defined event threshold. For example, the defined threshold period of time may be between 10 seconds and five minutes. In some embodiments, the defined threshold period of time may vary based on the current PHY symbol rate. Hysteresis may be used to alter the defined threshold period of time. For example, if block 930 has been performed within a separately defined period of time, such as the last five minutes, the defined threshold period of time may be extended. In some embodiments, if the amount of data being transferred using the ACL link exceeds a data transfer threshold, block 920 may be determined in the negative. If no previous high throughput event has occurred, establishment of the Bluetooth LE communication link at block 905 may be used for measuring the amount of time.

If determined that the amount of time elapsed since the high throughput event has met the defined threshold, method 900 can proceed to block 925. At block 925, the PHY symbol rate of the ACL link (uplink, downlink, or both) is altered. Altering the PHY symbol rate at block 925 can involve stepping down to a next lower symbol rate, such as from 2M to 1M, from 1M to coded (S=2), or from coded (S=2) to coded (S=8). Alternatively, a symbol rate may be skipped, such as an alteration from 2M to coded (S=2). Communications are exchanged between the first and second devices to determine when the PHY symbol rate of the ACL link will be updated. A particular upcoming (e.g., the next) anchor point of the Bluetooth LE communication link may identified as the common point when communication on the ACL uplink, ACL downlink, or both will have the PHY symbol rate adjusted. Notably, for devices that are compatible with this functionality, the Bluetooth LE communication link does not need to be restarted, thus allowing for communication to remain continuous. As an example, this ability to change PHY symbol rate without restarting the Bluetooth LE communication link may be included in devices manufactured by a common manufacturer. Therefore, an audio source device (e.g., smartphone) and audio output device (true wireless earbuds) may be compatible with the ability to agree with the other device on an anchor point at which to change PHY symbol rate.

Following block 925 or block 920, method 900 can continue to be performed by returning to block 910, at which data is transmitted using the current PHY symbol rate.

FIG. 10 illustrates an embodiment of a method 1000 for increasing a link margin of a wireless communication link. Method 1000 can be applied to an ACL uplink, an ACL downlink, or collectively to the ACL link. The blocks of method 1000 can be performed by the audio source device, the audio output device, or a combination of both. Method 1000 can be performed involving an audio source device and an audio output device, such as earbuds (e.g., true wireless earbuds), a wireless speaker, headphones, etc. In the case of true wireless earbuds in which there is a separate CIS link for each earbud, method 1000 can be applied to both earbuds or to an individual earbud. Method 1000 could also be performed between two devices (e.g., a first wireless device and a second wireless device) that utilize a Bluetooth LE communication link for purposes other than audio transfer. For example, an ACL link may be used for communication by a wireless input device (e.g., keyboard, mouse) or a smart watch. In some embodiments, a voice command spoken by a user to a device, such as spoken to an audio output device, can be transmitted to the audio source device via an ACL link. The description of method 1000 refers to Bluetooth LE, however, it should be understood that the same principles can be applied to other short-range wireless communication technologies.

At block 1005, an initial Bluetooth pairing process can be performed between the audio output device and the audio source. During the pairing process, the capabilities of the devices may be discovered. As part of block 1005, a determination is made that the audio source device and the audio output device are mutually compatible with performing PHY symbol rate adjustments without ending and restarting a Bluetooth LE communication link. The determination may be made based on both the audio source device and the audio output device having been manufactured by the same manufacturer. At block 1010, a Bluetooth LE communication link is established between an audio source and an audio output device. When the Bluetooth LE communication link is established, an ACL link may be created. By default, a particular PHY symbol rate, such as the maximum symbol rate of 2M, may be initially used for the PHY symbol rate of the ACL link (e.g., in both the uplink and downlink directions) of a Bluetooth LE communication link.

At block 1015, data is transmitted using the Bluetooth LE communication between the audio output device and the audio source device via the ACL link, such as playback requests (e.g., stop, play, rewind), volume change requests (e.g., up volume, down volume, mute). ACKs and NAKs can also be transmitted in response to received (and improperly received) packets on the ACL link. Initially, transmission of data can be performed using the initial symbol rate set at block 1005, such as 2M.

At block 1020, a high throughput event can be monitored for by the audio output device and/or the audio source device as detailed in relation to block 915 of FIG. 9. If a high throughput event is detected at block 1020, method 1000 proceeds to block 1035, which can be performed similarly to block 930. If a high throughput event has not been detected at block 1020, method 1000 proceeds to block 1025. At block 1025, either the audio source device or the audio output device can determine whether an amount of time that has elapsed since a previous high throughout event has met a defined threshold. For example, the defined threshold period of time may be between 10 seconds and five minutes. In some embodiments, the defined threshold period of time may vary based on the current PHY symbol rate. Hysteresis may be used to alter the defined threshold period of time. For example, if block 1035 has been performed within a separately defined period of time, such as the last five minutes, the defined threshold period of time may be extended. In some embodiments, if the amount of data being transferred using the ACL link exceeds a data transfer threshold, block 1025 may be determined in the negative. If no previous high throughput event has occurred, establishment of the Bluetooth LE communication link at block 1010 may be used for measuring the amount of time.

If determined that the amount of time elapsed since the high throughput event has met the defined threshold, method 1000 can proceed to block 1030. At block 1030, the PHY symbol rate of the ACL link (uplink, downlink, or both) is altered. Altering the PHY symbol rate at block 1030 can involve stepping down to a next lower symbol rate, such as from 2M to 1M, from 1M to coded (S=2), or from coded (S=2) to coded (S=8). Alternatively, a symbol rate may be skipped, such as an alteration from 2M to coded (S=2). Communications are exchanged between the audio source device and the audio output device to determine when the PHY symbol rate of the ACL link will be updated. A particular upcoming (e.g., the next) anchor point of the Bluetooth LE communication link may identified as the common point when communication on the ACL uplink, ACL downlink, or both will have the PHY symbol rate adjusted. Notably, for audio output devices and audio source devices that are compatible with this functionality, the Bluetooth LE communication link does not need to be restarted, thus allowing for audio playback to remain continuous. As an example, this ability to change PHY symbol rate without restarting the Bluetooth LE communication link may be included in devices manufactured by a common manufacturer. Therefore, an audio source device (e.g., smartphone) and audio output device (true wireless earbuds) may be compatible with the ability to agree with the other device on an anchor point at which to change PHY symbol rate.

Following block 1030 or block 1025, method 1000 can continue to be performed by returning to block 1015, at which data is transmitted using the current PHY symbol rate.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for using a short-range wireless communication link, the method comprising:
    transmitting, by a source wireless communication device, data using and asynchronous connection-oriented logical transport (ACL) link of the short-range wireless communication link;
    determining an amount of time that has elapsed since a high throughput event on the ACL of the short-range wireless communication link;
    based on determining the amount of time, decreasing a first physical layer (PHY) symbol rate of the ACL to a second PHY symbol rate, wherein a link margin between the source wireless communication device and a second wireless communication device is increased based on altering the first PHY symbol rate of the ACL to the second PHY symbol rate; and
    transmitting, by the source wireless communication device, data using the ACL and the second PHY symbol rate.

2. The method of claim 1, wherein the high throughput event is identified based on an amount of data to be transmitted.

3. The method of claim 1, wherein the high throughput event is identified based on a detected change in use of the ACL.

4. The method of claim 1, wherein determining the amount of time that has elapsed since the high throughput event further comprises determining whether the amount of time has met a defined event threshold.

5. The method of claim 1, wherein the first PHY symbol rate is two million symbols per second and the second PHY symbol rate is either one million symbols per second or is a coded PHY symbol rate.

6. The method of claim 1, further comprising:
    performing a pairing process between the source wireless communication device and the second wireless communication device to determine that PHY symbol rates are eligible to be altered without restarting the short-range wireless communication link.

7. The method of claim 1, wherein the source wireless communication device is an audio streaming device and an audio output device that receives the data using the ACL is a pair of true wireless earbuds.

8. The method of claim 1, wherein the short-range wireless communication link is a Bluetooth LE communication link and altering the first PHY symbol rate of the ACL link is performed without restarting the short-range wireless communication link.

9. A wireless communication system, comprising:
    a source wireless communication device that communicates wirelessly using a short-range wireless communication link, the source wireless communication device is configured to:
        transmit data using and asynchronous connection-oriented logical transport (ACL) of the short-range wireless communication link;
        determine an amount of time that has elapsed since a high throughput event on the ACL of the short-range wireless communication link;
        based on determining the amount of time, decrease a first physical layer (PHY) symbol rate of the ACL to a second PHY symbol rate, wherein a link margin between the source wireless communication device and a second wireless communication device is increased based on altering the first PHY symbol rate of the ACL to the second PHY symbol rate; and
        transmit data using the ACL and the second PHY symbol rate.

10. The wireless communication system of claim 9, further comprising true wireless earbuds, wherein the source wireless communication device is a smartphone.

11. The wireless communication system of claim 9, wherein the high throughput event is identified based on an amount of data to be transmitted.

12. The wireless communication system of claim 9, wherein the high throughput event is identified based on a detected change in use of the ACL.

13. The wireless communication system of claim 9, wherein the source wireless communication device being configured to determine the amount of time that has elapsed since the high throughput event further comprises the source wireless communication device being configured to determine whether the amount of time has met a defined event threshold.

14. The wireless communication system of claim 9, wherein the first PHY symbol rate is two million symbols per second and the second PHY symbol rate is either one million symbols per second or is a coded PHY symbol rate.

15. The wireless communication system of claim 9, wherein altering the first PHY symbol rate of the ACL is performed without restarting the short-range wireless communication link.

16. The wireless communication system of claim 9, wherein the short-range wireless communication link is a Bluetooth LE communication link.

17. The wireless communication system of claim 16, wherein the source wireless communication device is further configured to:
  perform a pairing process with the second wireless communication device to determine that PHY symbol rates are eligible to be altered without restarting the short-range wireless communication link.

18. A wireless communication device, comprising:
  a wireless communication interface that communicates wirelessly using a short-range wireless communication link; and
  a processing system comprising one or more processors in communication with the wireless communication interface, wherein the processing system is configured to:
    transmit data using and asynchronous connection-oriented logical transport (ACL) of the short-range wireless communication link;
    determine an amount of time that has elapsed since a high throughput event on the ACL of the short-range wireless communication link;
    based on determining the amount of time, decrease a PHY symbol rate of the ACL to a second PHY symbol rate, wherein a link margin between the wireless communication device and a second wireless communication device is increased based on altering the PHY symbol rate of the ACL to the second PHY symbol rate; and
    transmit data using the ACL and the second PHY symbol rate.

19. The wireless communication device of claim 18, wherein the short-range wireless communication link is a Bluetooth LE communication link.

* * * * *